United States Patent
Vari et al.

(10) Patent No.: US 10,341,855 B2
(45) Date of Patent: Jul. 2, 2019

(54) DETECTION OF UNSECURE CALLS BY COMMUNICATIONS DEVICE

(71) Applicant: Polycom, Inc., San Jose, CA (US)

(72) Inventors: Venkata Ganesh Vari, Hyderabad (IN); Abhishek Mishra, Miyapur (IN); Shantanu Desai, Hyderabad (IN)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/395,802

(22) Filed: Dec. 30, 2016

(65) Prior Publication Data
US 2017/0318456 A1    Nov. 2, 2017

(30) Foreign Application Priority Data
Apr. 28, 2016   (IN) ............................. 201631014831

(51) Int. Cl.
| H04M 1/66 | (2006.01) |
| H04W 12/02 | (2009.01) |
| H04M 1/60 | (2006.01) |
| H04M 1/725 | (2006.01) |

(52) U.S. Cl.
CPC ......... *H04W 12/02* (2013.01); *H04M 1/6033* (2013.01); *H04M 1/6041* (2013.01); *H04M 1/72519* (2013.01); *H04M 1/72583* (2013.01)

(58) Field of Classification Search
CPC ............................ H04W 12/001; H04W 12/02
See application file for complete search history.

(56) References Cited

U.S. PATENT DOCUMENTS

| 5,939,951 | A  |   | 8/1999  | Bateman et al. |
| 6,181,550 | B1 | * | 1/2001  | Kim ...................... G06F 1/1616 361/679.06 |
| 6,353,382 | B1 |   | 3/2002  | Hymel |
| 6,522,894 | B1 | * | 2/2003  | Schmidt ................ H04M 1/605 455/552.1 |
| 6,795,544 | B1 | * | 9/2004  | D'Arcy ............... H04M 1/6041 379/219 |
| 7,734,034 | B1 |   | 6/2010  | Coughlan et al. |
| 7,990,926 | B2 |   | 8/2011  | Creamer et al. |
| 8,279,798 | B2 |   | 10/2012 | Preiss et al. |
| 8,326,327 | B2 |   | 12/2012 | Hymel et al. |

(Continued)

FOREIGN PATENT DOCUMENTS

EP    2672222    1/2014

OTHER PUBLICATIONS

L.Liess et al. URNs for the Alert-Info Header Field of the Session Initiation Protocol (SIP) Mar. 2015 Internet Engineering Task Force (IETF) Category: Standards Track ISSN: 2070-1721 p. 1.*

*Primary Examiner* — Shantell L Heiber
(74) *Attorney, Agent, or Firm* — Blank Rome, LLP

(57) ABSTRACT

Disclosed are communications devices which can send indications that they are secure, and which can detect when a far end device is not secure (unsecure). A secure device is one that is not connected to a speakerphone or other speaker which is capable of emitting—or actually is emitting—sound which is louder than a certain threshold. If a communication device detects that a remote endpoint is unsecure, the communication device will switch to an unsecure mode. When the switch is made, the communications device alerts the user that the call is not secure so that the user can proceed accordingly.

19 Claims, 5 Drawing Sheets

(56) References Cited

U.S. PATENT DOCUMENTS

| | | |
|---|---|---|
| 8,385,888 B2 | 2/2013 | Labrador et al. |
| 8,630,632 B2 | 1/2014 | Cormier et al. |
| 8,660,531 B2 | 2/2014 | Hymel |
| 8,670,556 B2 * | 3/2014 | Fried ................. H04M 1/72519 379/219 |
| 8,712,327 B2 | 4/2014 | Abratowski et al. |
| 8,731,475 B1 * | 5/2014 | Youngs ................... G10L 25/51 455/220 |
| 8,816,958 B2 | 8/2014 | Kalu et al. |
| 8,849,972 B2 * | 9/2014 | Tsym ................. H04L 67/1008 709/223 |
| 8,976,950 B2 | 3/2015 | Kramarenko et al. |
| 9,294,718 B2 | 3/2016 | Hymel et al. |
| 9,553,973 B2 * | 1/2017 | Clarke ................ H04M 1/6041 |
| 2009/0141948 A1 | 6/2009 | Nakaoka et al. |
| 2009/0325653 A1 * | 12/2009 | Kim ...................... H04M 1/03 455/575.1 |
| 2011/0280151 A1 | 11/2011 | Medynski et al. |
| 2012/0108166 A1 | 5/2012 | Hymel |
| 2012/0171994 A1 * | 7/2012 | Singh ...................... H04W 4/20 455/410 |
| 2013/0173455 A1 * | 7/2013 | Adams ..................... H04B 5/00 705/39 |
| 2013/0318449 A2 | 11/2013 | Dent et al. |
| 2016/0316401 A1 * | 10/2016 | Adderly ............ H04W 36/0038 |
| 2017/0054755 A1 * | 2/2017 | Mendiratta ............. H04L 63/20 |

* cited by examiner

DETECTION OF UNSECURE CALLS BY COMMUNICATIONS DEVICE

CROSS-REFERENCE TO RELATED APPLICATION

This application claims priority to India Application No. 201631014831, filed on Apr. 28, 2016, which is fully incorporated by reference herein.

TECHNICAL FIELD

The present disclosure relates generally to communications devices, and more particularly, to devices which can operate in a secure mode and detect when far end devices with which they are communicating are not secure.

BACKGROUND

When a person makes a phone call that person does not know if the endpoint called is using a speakerphone. In other words, the caller is unable to know for certain that what they say is not being overheard by others. For calls of a sensitive nature, this can be problem. The subject matter of this disclosure is directed to overcoming, or at least reducing, the effects of problems such as these.

BRIEF DESCRIPTION OF THE DRAWINGS

In order to describe the manner in which the features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
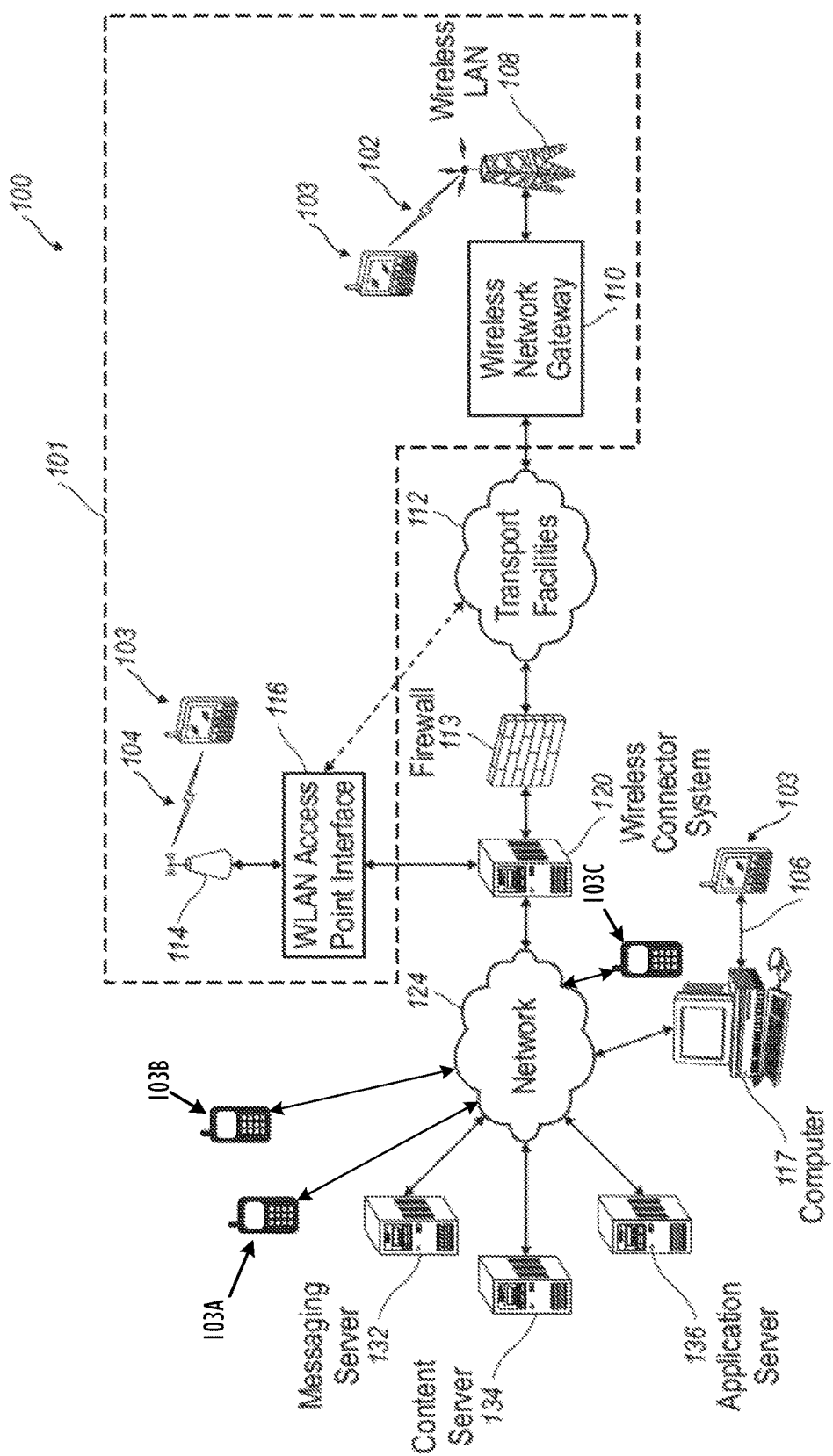
FIG. 1 is a block diagram illustrating a communications environment, in accordance with an embodiment of this disclosure.

Various embodiments of the disclosure are discussed in detail below. While specific implementations are discussed, it should be understood that this is done for illustration purposes only. A person skilled in the relevant art will recognize that other components and configurations may be used without parting from the scope of the disclosure.

Several definitions that apply throughout this document will now be presented. The phrase 'coupled' is defined as connected, whether directly or indirectly, through intervening components and is not necessarily limited to physical connections. Coupled devices are devices which are in signal communication with one another. The term 'server' refers to computer programs or devices that provide functionality for other programs or devices. The term 'VoIP' refers to Voice over Internet Protocol, which is a methodology and group of technologies for the delivery of voice communications and multimedia sessions over Internet Protocol (IP) networks, such as the Internet. The terms Internet telephony, broadband telephony, and broadband phone service specifically refer to the provisioning of communications services (voice, fax, SMS, voice-messaging) over the public Internet. The term 'Session Initiation Protocol' (a/k/a SIP) refers to a communications protocol for signaling and controlling multimedia communication sessions such as voice and video calls. SIP is an example of a VOIP. The most common applications of SIP are in Internet telephony, as well as instant messaging, over Internet Protocol (IP) networks. The protocol defines the messages that are sent between endpoints, which govern establishment, termination and other essential elements of a call. SIP can be used for creating, modifying and terminating sessions consisting of one or several media streams. SIP is an application layer protocol designed to be independent of the underlying transport layer. SIP is a text-based protocol, incorporating many elements of the Hypertext Transfer Protocol (HTTP) and the Simple Mail Transfer Protocol (SMTP). SIP can operate in conjunction with several other application layer protocols that identify and carry the session media. Media identification and negotiation is achieved with the Session Description Protocol (SDP). For the transmission of media streams (voice, video) SIP typically employs the Real-time Transport Protocol (RTP) or Secure Real-time Transport Protocol (SRTP). For secure transmissions of SIP messages, the protocol may be encrypted with Transport Layer Security (TLS). Modifications can be made within SIP to enable implementations of the technology described herein. The term 'speakerphone' includes a telephone with a microphone and loudspeaker provided separately from those in the handset; the term also includes the loudspeaker itself, as in the commonly used expression, "put it on speakerphone." This device allows multiple persons to participate in a conversation. The loudspeaker broadcasts the voice or voices of those on the other end of the telephone line, while the microphone captures all voices of those using the speakerphone. However, such calls can invite unwanted listeners.

Aspects of this disclosure are directed to communications devices which can send indications that they are secure, and which can detect when a far end device is not secure (unsecure). In at least one embodiment, a secure device is one that is not connected to a speakerphone or other speaker which is capable of emitting—or indeed is emitting—sound which is louder than a certain threshold. Such a threshold could be set at a volume which is consistent with a phone placed to the side of a user's head, and which only the user can hear. An embodiment of such a communication device can operate in a secure mode and an unsecure mode. A communication device can detect actuation of a selectable input, such as the pressing of a call button, selection of a call icon, or receiving a call command through a microphone. If a user selects to make a secure call, the device can be set in a secure mode and the call is placed. The device is configured such that if it receives, responsive to the placed call, one or more communications from a remote endpoint that indicate that the remote endpoint called is operating in a secure mode, the call device will remain in secure mode. If, however, it receives an indication that the endpoint (or another endpoint which joins the call) is not operating in a secure mode (e.g., the endpoint is using a speakerphone), the communication device will switch to an unsecure mode. When the switch is made the device may provide an indication of the switch, such as by rendering a visual alert, sounding an audio alert, or both.

In one embodiment the communications device can present the caller with the option of cancelling the call when the device has switched to the unsecure mode. The communications device can also be configured to automatically terminate the call instead.

In one embodiment the communications device can detect whether the remote endpoint is operating in a secure mode by detecting that communications from the endpoint do not comply with a predetermined protocol, (e.g., a modified SIP). The predetermined protocol can be a session initiation protocol containing a Polycom-Termination-Info header, which includes at least a speakerphone-on parameter and a speakerphone-off parameter. Further, the predetermined protocol can be a session initiation protocol containing a SIP Alert-Info header, which includes information such as an alert-category parameter and an alert-indication parameter. As is known by those of skill in the art, SIP Alert-Info headers are defined by Request for Comments (RFC) 7462. In at least one embodiment, an alert-category is a speakerphone detection for which alert-indication values of no and yes are defined. Specifically, in one embodiment, a communications device can be configured to switch to the unsecure mode when it receives a communication containing "urn:alert:speakerphone:yes."

In one embodiment, the communications device can be adapted to detect when the communications device is coupled to a speakerphone device, and upon such detection, switch to the unsecure mode. In an embodiment a speakerphone device can be one which is capable of producing audio which is 80 dB or louder.

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

FIG. 1 illustrates, in block diagram form, a network environment 100 in which implementations of the technology disclosed herein can be applied. The network environment 100 may comprise a number of communications devices 103 that may be connected to the remainder of network environment 100 in any of several different ways. Accordingly, several instances of communications devices 103 are depicted in FIG. 1 employing different example of ways of connecting to network 100.

These figures are exemplary only, and those persons skilled in the art will appreciate that additional elements and modifications may be necessary to make the communications device, (e.g., 103) operable in particular network environments. While in the illustrated implementations the communication devices, (e.g., 103) may comprise smart phones, in other implementations, the communications devices, may comprise tablet computers, laptop computers, desktop computers, servers, or other communications devices capable of sending and receiving electronic messages.

In FIG. 1, communications devices 103 are connected to a wireless network 101, that may comprise one or more of a Wireless Wide Area Network (WWAN) 102 and a Wireless Local Area Network (WLAN) 104, or other suitable network arrangements. In some implementations, the communications devices 103 are configured to communicate over both the WWAN 102 and WLAN 104, and to roam between these networks. In some implementations, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the communications devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the communications devices 103 to transport facilities 112, and, through the transport facilities 112, to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network, (e.g., an intranet), and its resources, or the wireless connector system 120 may be operated by a mobile network provider. In some implementations, the network 124 may be realized using the Internet rather than, or in addition to, an internal or enterprise network.

The wireless network gateway 110 provides an interface between the wireless connector system 120 and the WWAN 102, which facilitates communication between the communications devices 103 and other devices (not shown) connected, directly or indirectly, to the WWAN 102. Accordingly, communications sent via the communications devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the communications devices 103.

The WLAN 104 comprises a wireless network that, in some implementations, conforms to IEEE 802.11x standards (sometimes referred to as Wi-Fi™) such as the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area. Other communications protocols can be used, such as Session Initiation Protocol (SIP)

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly, (for example, if the access point 114 is part of an enterprise WLAN 104 in which the wireless connector system 120 resides), or indirectly, as indicated by the dashed line in FIG. 1, via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed communications devices 103. The wireless connector system 120 also provides administrative control and management capabilities over users and communications devices 103 that might connect to the wireless connector system 120.

The wireless connector system 120 allows the communications devices 103 to access the network 124 and connected resources and services such as a messaging server 132 (for example, a Microsoft Exchange Server™, IBM Lotus Domino™, or Novell GroupWise™ email server), a content server 134 for providing content such as Internet content or content from an organization's internal servers, application servers 136 for implementing server-based applications such as instant messaging (IM) applications to communications devices 103, and intranet file services.

The wireless connector system 120 typically provides a secure exchange of data (e.g., email messages, personal information manager (PIM) data, and IM data) with the communications devices 103. In some implementations, communications between the wireless connector system 120 and the communications devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the communications device 103, and can typically be regenerated by the user on communications devices 103. Data sent to the communications devices 103 is encrypted by the wireless connector system 120 using the private encryption key retrieved from the user's mailbox. The encrypted data, when received on the communications devices 103, is decrypted using the private encryption key stored in memory. Similarly, data sent to the wireless connector system 120 from the communications devices 103 is encrypted using the private encryption key stored in the memory of the communications devices 103. The encrypted data, when received on the wireless connector system 120, is decrypted using the private encryption key retrieved from the user's mailbox.

The wireless network gateway 110 is adapted to send data packets received from the communications devices 103 over the WWAN 102 to the wireless connector system 120. The wireless connector system 120 then sends the data packets to the appropriate connection point such as the messaging server 132, content servers 134 or application server 136. Conversely, the wireless connector system 120 sends data packets received, for example, from the messaging server 132, content servers 134 or application servers 136 to the wireless network gateway 110 that then transmit the data packets to the destination communications devices 103. The AP interfaces 116 of the WLAN 104 provide similar sending functions between the communications devices 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. The network 124 may comprise wireless network 219, (see FIG. 2). A communications device 103 may alternatively connect to the wireless connector system 120 using a computer 117, such as desktop or notebook computer, via the network 124. A link 106 may be provided for exchanging information between the communications device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the communications device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one of, or a combination of, an infrared (IR) connection such as an Infrared Data Association (IrDA) connection, a short-range radio frequency (RF) connection such as one specified by IEEE 802.15.1, or the BLUETOOTH™ special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the communications devices 103. Suitable variations of the communication system will be understood to a person of skill in the art and are intended to fall within the scope of the present disclosure.

Figure 2:
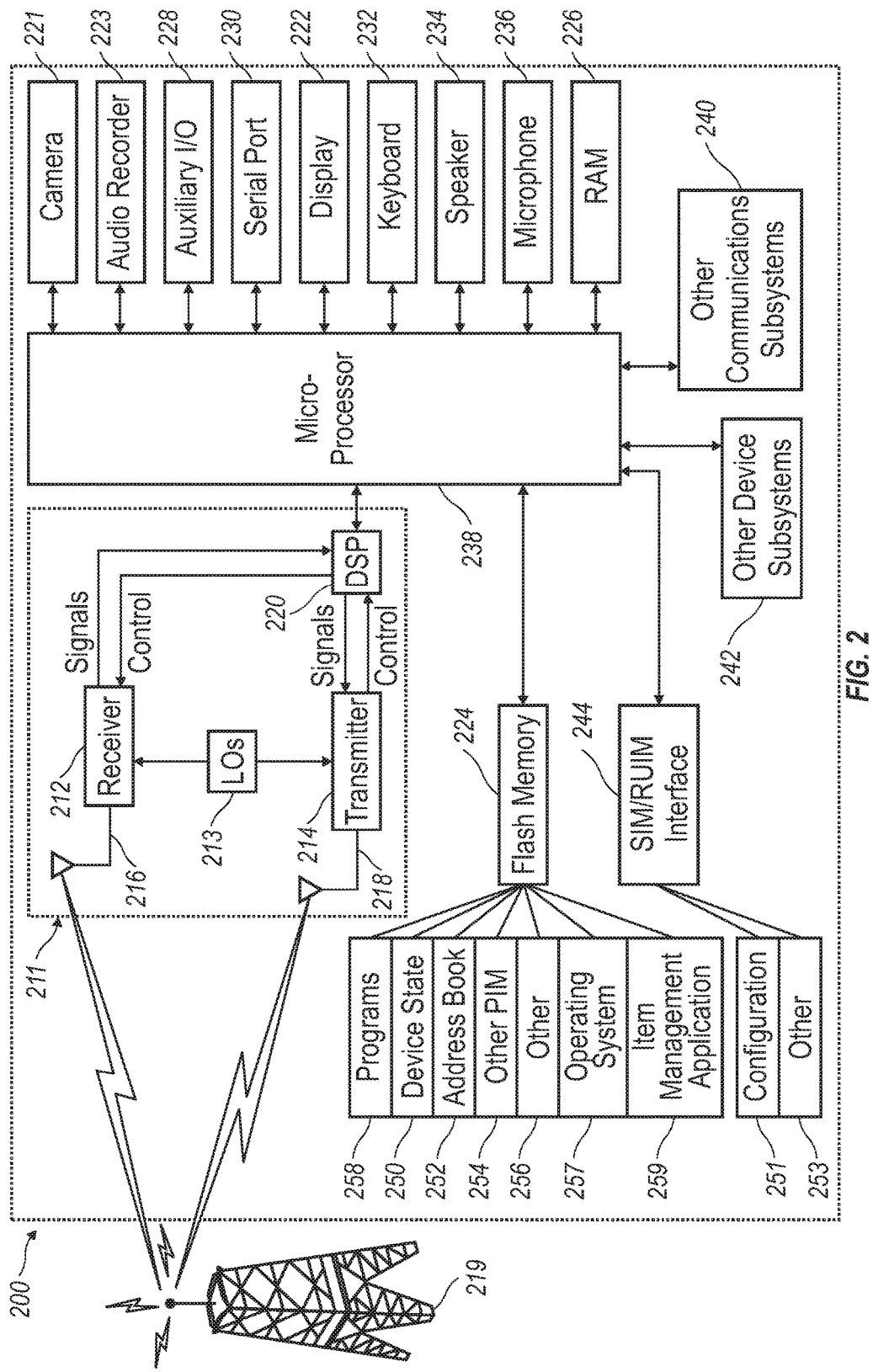
FIG. 2 is a block diagram of a communications device, in accordance with an embodiment of this disclosure.

FIG. 2 is a block diagram of a communications device, such as 300 and 103, in accordance with an exemplary implementation. As shown, the device 300 includes a processor 238 that controls the operation of the communications device 300. A communication subsystem 211 performs communication transmission and reception with the wireless network 219. The microprocessor 238 further can be communicatively coupled with an auxiliary input/output (I/O) subsystem 228. In at least one implementation, the processor 238 can be communicatively coupled to a serial port (for example, a Universal Serial Bus port) 230 that can allow for communication with other devices or systems via the serial port 230. A display 222 can be communicatively coupled to processor 238 to allow for display of information to an operator of the communications device 300. When the communications device 300 is equipped with a keyboard 232, the keyboard can also be communicatively coupled with the processor 238. The communications device 300 can include a speaker 234, a microphone 236, random access memory (RAM) 226, and flash memory 224, all of which may be communicatively coupled to the processor 238. Other similar components may be provided on the communications device 300 as well and optionally communicatively coupled to the processor 238. Other communication subsystems 240 and other device subsystems 242 are generally indicated as being functionally connected with the processor 238 as well. An example of a communication subsystem 240 is a short range communication system such as BLUETOOTH™ communication module or a WI-FI® communication module (a communication module in compliance with IEEE 802.11b) and associated circuits and components. Examples of other device subsystem 242 include a sensor and implementations of the present technology.

Additionally, the processor 238 is able to perform operating system functions and enables execution of programs on the communications device 300. In some implementations, not all of the above components are included in the communications device 300. For example, in at least one implementation, the keyboard 232 is not provided as a separate component and is instead integrated with a touch screen as described below.

The auxiliary I/O subsystem 228 can take the form of a variety of different navigation tools (multi-directional or single-directional) such as a touch-sensitive interface or other I/O interface. These navigation tools may be located on the front surface of the communications device 300 or may be located on any exterior surface of the communications device 300. Other auxiliary I/O subsystems may include external display devices and externally connected keyboards (not shown). While the above examples have been provided in relation to the auxiliary I/O subsystem 228, other subsystems capable of providing input or receiving output from the communications device 300 are considered within the scope of this disclosure. Additionally, other keys may be placed along the side of the communications device 300 to function as escape keys, volume control keys, scrolling keys, power switches, or user programmable keys, and may likewise be programmed accordingly.

The keyboard 232 can include a plurality of keys that can be of a physical nature such as actuable buttons, or the actuable buttons can be of a software nature, typically constituted by representations of physical keys on a display 222 (referred to herein as "virtual keys").

In the case of virtual keys, the indicia for the respective keys are shown on the display 222, which in one implementation is enabled by touching the display 222, for example, with a stylus, finger, fingertip, finger nail, or other pointer, to generate the character or activate the indicated command or function. Some examples of displays 222 capable of detecting a touch include resistive, capacitive, projected capacitive, infrared and surface acoustic wave (SAW) touch screens.

Furthermore, the communications device 300 is equipped with components to enable operation of various programs, as shown in FIG. 2. In an exemplary implementation, the flash memory 224 is enabled to provide a storage location for the operating system 257, device programs 258, and data. The operating system 257 is generally configured to manage other programs 258 that are also stored in memory 224 and executable on the processor 238. The operating system 257 honors requests for services made by programs 258 through predefined program interfaces. More specifically, the operating system 257 typically determines the order in which multiple programs 258 are executed on the processor 238 and the execution time allotted for each program 258, manages the sharing of memory 224 among multiple programs 258, handles input and output to and from other device subsystems 242, and so on. In addition, operators typically can interact directly with the operating system 257 through a user interface usually including the keyboard 232 and display 222. While in an exemplary implementation the operating system 257 is stored in flash memory 224, the operating system 257 in other implementations is stored in read-only memory (ROM) or similar storage element (not shown). As those skilled in the art will appreciate, the operating system 257, device program 258, or parts thereof, may be loaded in RAM 226 or other volatile memory.

In some implementations, the flash memory 224 may contain programs 258 for execution on the device 300, including—but not limited to—an address book 252, a personal information manager (PIM) 254, and a device state 250. Furthermore, programs 258 such as social software and other information 256 including data can be segregated upon storage in the flash memory 224 of the device 300.

When the communications device 300 is enabled for two-way communication within the wireless communication network 219, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-T9), Ultra Mobile Broadband (UMB) networks, Worldwide Interoperability for Microwave Access (WiMAX), and other networks that can be used for data and voice, or just data or voice. For the systems listed above, the communications device 300 may use a unique identifier to enable the communications device 300 to transmit and receive signals from the communication network 219. Other systems may not use such identifying information. GPRS, UMTS, and EDGE use a Subscriber Identity Module (SIM) in order to allow communication with the communication network 219. Likewise, most CDMA systems use a Removable User Identity Module (RUIM) in order to communicate with the CDMA network. The RUIM and SIM card can be used in multiple different communications devices 300. A communications device 300 can be configured to operate some features without a SIM/RUIM card, but a communications device will not necessarily be able to communicate with the network 219. A SIM/RUIM interface 244 located within the communications device 300 allows for removal or insertion of a SIM/RUIM card (not shown). The SIM/RUIM card features memory and holds key configurations 251 and other information 253 such as identification and subscriber related information. With a properly enabled communications device 300, two-way communication between the communications device 300 and communication network 219 is possible.

The two-way communication enabled communications device 300 is able to both transmit and receive information from the communication network 219. The transfer of communication can be from the communications device 300 or to the communications device 300. In order to communicate with the communication network 219, the device 300 can be equipped with an integral or internal antenna 218 for transmitting signals to the communication network 219. Likewise the device 300 can be equipped with another antenna 216 for receiving communication from the communication network 219. These antennae (216, 218) in another exemplary implementation are combined into a single antenna (not shown). As one skilled in the art would appreciate, the antenna or antennae (216, 218) in another implementation can be externally mounted on the communications device 300.

The communications device 300 features a communication subsystem 211. As is understood in the art, a communication subsystem 211 can be modified so that a communication subsystem 211 can support the operational needs of a communications device 300. The subsystem 211 includes a transmitter 214 and receiver 212 including the associated antenna or antennae (216, 218) as described above, local oscillators (LOs) 213, and a processing module, that in the presently described implementation is a digital signal processor (DSP) 220.

It is contemplated that communication by the communications device 300 with the wireless network 219 can be any type of communication that both the wireless network 219 and communications device 300 are enabled to transmit, receive and process. In general, these can be classified as voice or data, or both voice and data. Voice communication generally refers to communication in which signals for audible sounds are transmitted by the communications device 300 through the communication network 219. Data generally refers to all other types of communication that the communications device 300 is capable of performing within the constraints of the wireless network 219.

Implementations of the technology can be realized as including programming on a mobile communications device, (e.g., 103, 300). In some implementations, programming for the technology is on the mobile communications device 103, while data used by the mobile communications device 103 is on the wireless connector system 120 or a network server such as content server 134, messaging server 132, or application server 136. In some implementations, programming for the technology can be realized on a remote server. Allocation of functionality among architectural elements can be a function of several factors including latency, processing resource availability and efficient usage, storage availability and efficient usage, and revenue opportunities. In at least one embodiment of this disclosure, a communications device 103*a* (e.g., device 300) can be configured such that if a secure call with another device 103*b* is joined by an unsecure device 103*c*, devices 103*a* and 103*b* will switch to an unsecure mode of operation.

Figure 3:
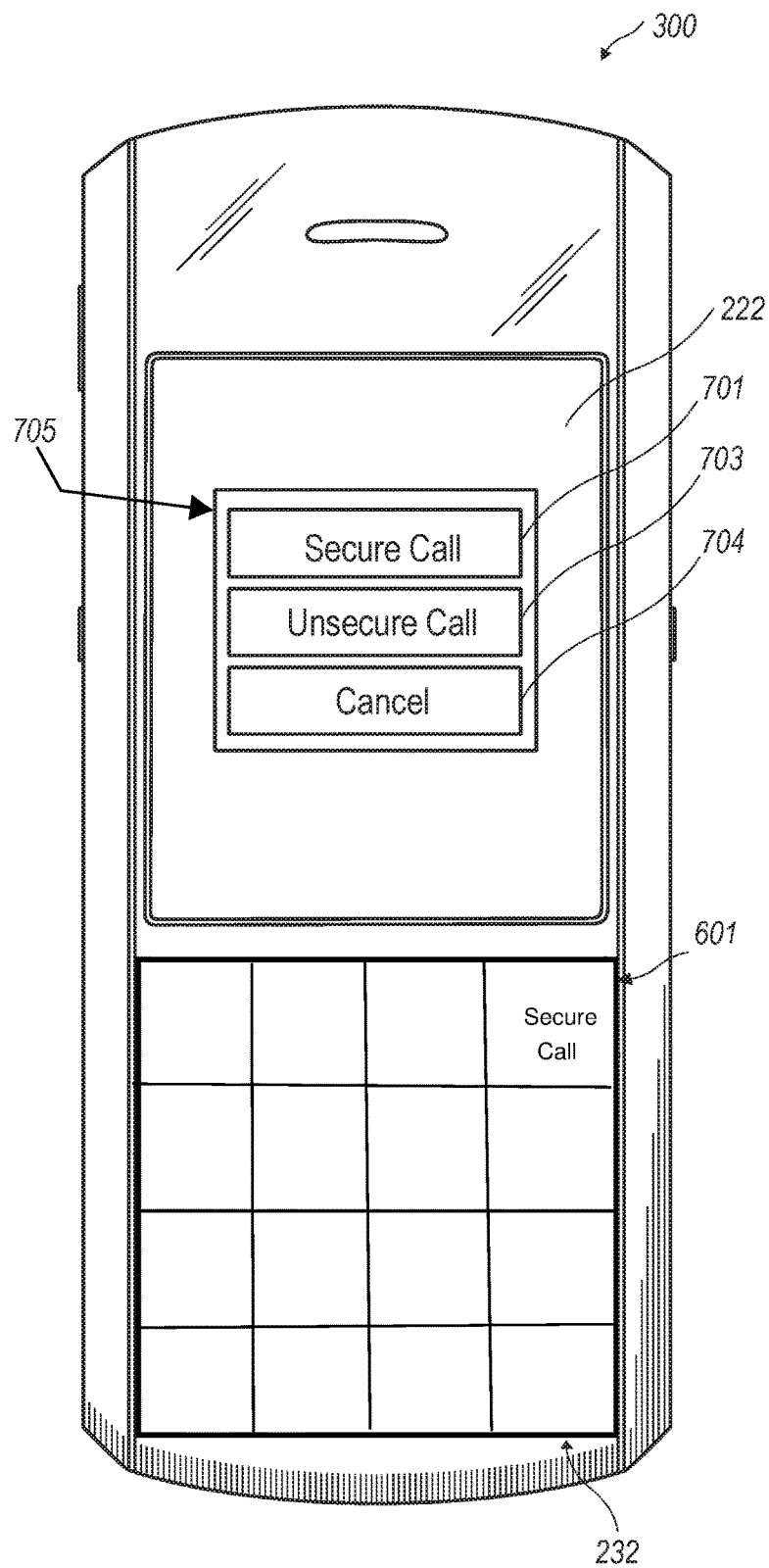
FIG. 3 illustrates a communications device, in accordance with an embodiment of this disclosure.

FIG. 3 illustrates a communications device 300 in accordance with an embodiment of this disclosure. Device 300 contains a display 222 which displays selectable icons or images which a user can select to make a secure call 701, an unsecure call 703, or close 704 the call window 705. Communications device 300 also contains a keyboard 232 containing user actuable keys 601 which can also be used to make call selections such as placing a secure call 601, placing an unsecure call, etc. As intimated above, when a secure call 701 is selected, the call placed will be secure until the device 300 receives an indication that the endpoint with which the device 300 is communicating is operating in an unsecure mode.

Figure 4:
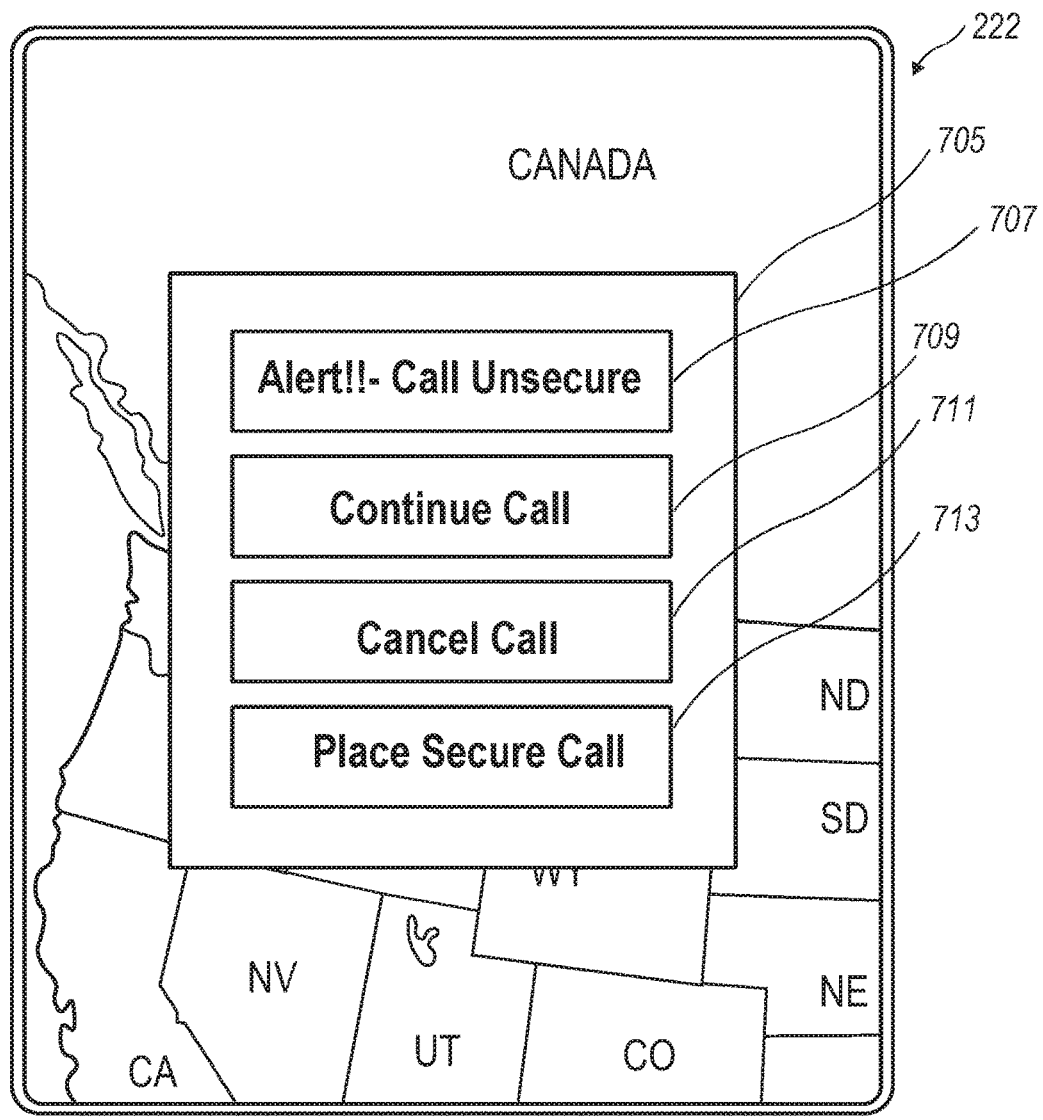
FIG. 4 illustrates a display of a communications device that has detected that a call participant is using an unsecure device, in accordance with an embodiment of this disclosure.

FIG. 4 illustrates a display 222 of a communications device (e.g., 103, 300) that has detected that a call participant is using an unsecure device 103 (such as one with an operating speakerphone). In the embodiment of FIG. 4, the call window 705 contains a message 707 alerting the user that the device 300 has switched to unsecure mode as a result. The user is presented with selectable icons to continue with the call 709, cancel the call 711, or to initiate an alternate secure call 713.

Figure 5:
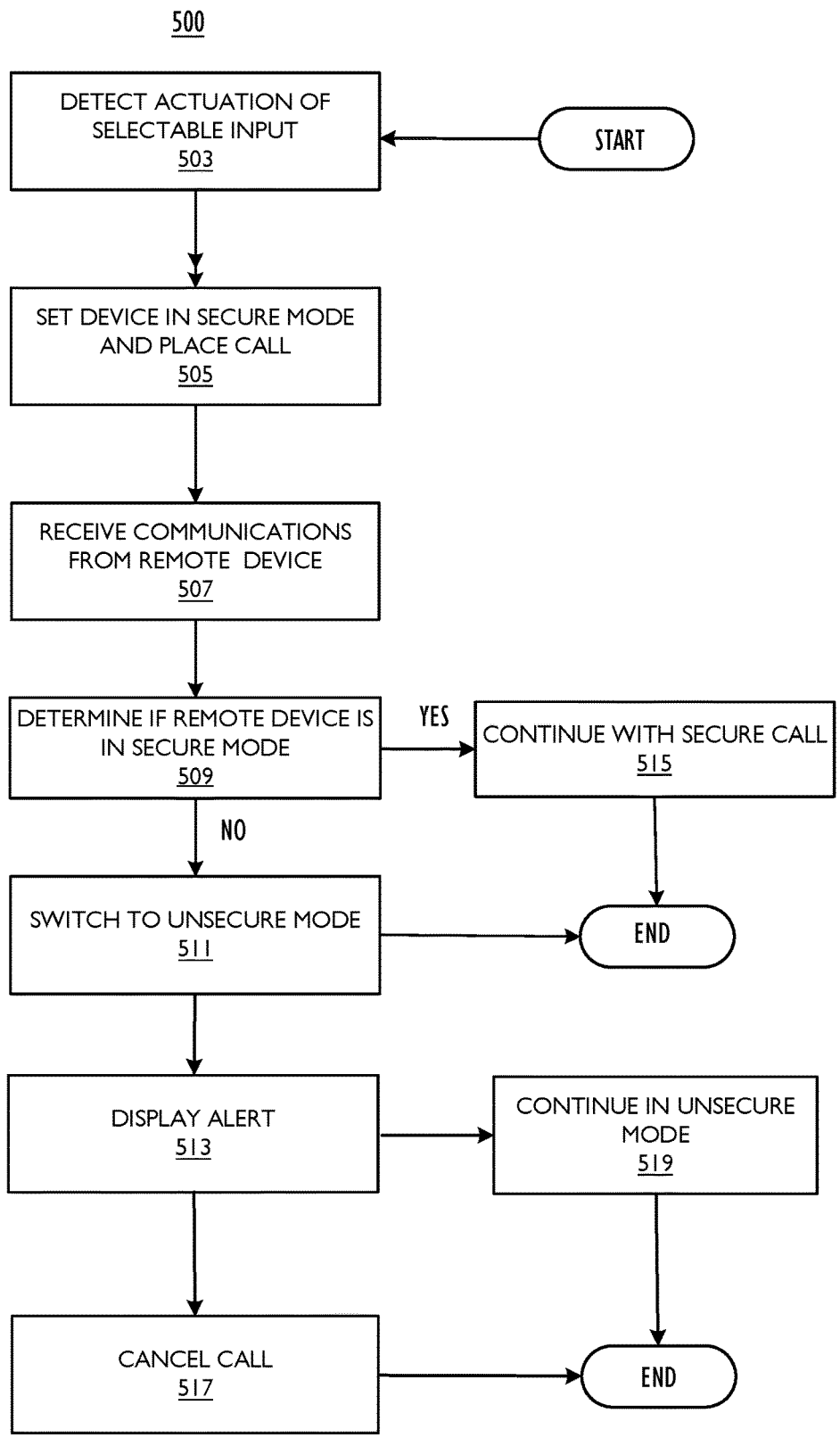
FIG. 5 illustrates a method of operation for a communications device, in accordance with an embodiment of this disclosure.

FIG. 5 illustrates a method 500 of operation for a communications device 103 in accordance with an embodiment of this disclosure. The method 500 starts by detecting 503 actuation of a selectable input (e.g., 701, 601). The method 500 then moves to block 505 which consists of setting the communications device in a secure mode responsive to the detection, and placing a secure call. The next step in the method 500 is receiving 507, responsive to the placed call, one or more communications from a remote endpoint. Thereafter, the communications device 103 detects 509 whether or not the remote endpoint is operating in a secure mode. If the remote endpoint is in a secure mode, the secure call can continue 515. Otherwise, the method 500 switches 511 communications device 103 to an unsecure mode upon detecting that the remote endpoint is not operating in a secure mode. If at any point during the secure call 515 the device 103 detects that one or more endpoints has become unsecure, the device 103 will switch to unsecure mode, (see FIG. 4).

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, the above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms such as "including" and "in which" are used as plain-English equivalents of the respective terms "comprising" and "wherein."

The invention claimed is:

1. A communications device configured to operate, alternatively, in a secure mode and an unsecure mode, the communications device comprising:
   at least one processor; and
   at least one non-transitory computer readable medium coupled to the processor, the at least one non-transitory computer readable medium storing instructions executable by the processor, the instructions comprising instructions to:
   detect actuation of a selectable input;
   set the communication device in the secure mode and place, at a first time, a secure call responsive to the detection;
   receive, responsive placement of the call, one or more communications from a remote endpoint;
   determine, based at least in part on the one or more communications, that the remote endpoint has, at a second time subsequent to the placement of the call, become physically connected directly to a loudspeaker which is configured to produce audio greater than or equal to 80 dB; and
   switch, responsive to such determination, the communications device from the secure mode to the unsecure mode.

2. The communications device of claim 1, wherein the instructions further comprise instructions to provide an indication when the communications device has been switched to the unsecure mode.

3. The communications device of claim 2, wherein the indication comprises a visual alert, an audio alert, or both.

4. The communications device of claim 1, wherein the instructions further comprise instructions to automatically terminate the call when the communications device has been switched to the unsecure mode.

5. The communications device of claim 1, wherein the instructions further comprise instructions to detect whether the remote endpoint is operating in a secure mode by detecting whether one or more of the communications does not comply with a predetermined protocol.

6. The communications device of claim 5, wherein the predetermined protocol is a session initiation protocol containing a Polycom-Termination-Info header, which includes at least a speakerphone-on parameter and a speakerphone-off parameter.

7. The communications device of claim 5, wherein the predetermined protocol is a session initiation protocol containing a SIP Alert-Info header, which includes information comprising at least an alert-category parameter and an alert-indication parameter.

8. The communications device of claim 7, wherein the SIP Alert-Info header is defined by RFC 7462, in which at least one alert-category is a speakerphone detection, for which alert-indication values of no and yes are defined.

9. The communications device of claim 8, wherein the instructions further comprise instructions to switch communications device to unsecure mode when a communication containing urn:alert:speakerphone:yes is received by the communications device.

10. A method for placing a secure telephonic call, the method comprising:
    detecting actuation of a selectable input;
    setting a communications device in a secure mode responsive to the detection;
    placing, at a first time, a secure call responsive to the detection;
    receiving, responsive to placing the secure call, one or more communications from a remote endpoint;
    determining, based at least in part on the one or more communications, that the remote endpoint has, at a second time subsequent to placing the call, been physically connected directly to a loudspeaker which is configured to produce audio greater than or equal to 80 dB;
    switching, responsive to such determination, the communications device to an unsecure mode;
    detecting when the communications device is coupled to a speakerphone device; and
    upon such detection, switching, the communications device to the unsecure mode.

11. The method of claim 10, further comprising providing an indication that the communications device has been switched to the unsecure mode.

12. The method of claim 11, wherein the indication comprises a visual alert, an audio alert, or both.

13. The method of claim 10, further comprising canceling the call upon actuation of a selectable cancellation input when the communications device has been switched to the unsecure mode.

14. The method of claim 10, further comprising detecting whether the remote endpoint is operating in a secure mode by detecting whether one or more of the one or more communications does not comply with a predetermined protocol.

15. The method of claim 14, wherein the predetermined protocol is a session initiation protocol containing a Polycom-Termination-Info header, which includes at least a speakerphone-on parameter and a speakerphone-off parameter.

16. The method of claim 14, wherein the predetermined protocol is a session initiation protocol containing a SIP Alert-Info header, which includes information comprising at least an alert-category parameter and an alert-indication parameter.

17. The method of claim 16, wherein the SIP Alert-Info header is defined by RFC 7462, in which at least one alert-category is a speakerphone detection, for which alert-indication values of no and yes are defined.

18. The method of claim 17, further comprising switching the communications device to the unsecure mode when a communication containing urn:alert:speakerphone:yes is received by the communications device.

19. A communications device, the communications device alternately operable in a secure mode and an unsecure mode, the communications devices configured to:
    detect actuation of a selectable input;
    set the communications device in the secure mode and place, at a first time, a secure call responsive to the detection;
    receive, responsive to placement of the call, one or more communications from a remote endpoint;
    determine, based at least in part on the one or more communications, that the remote endpoint has, at a second time subsequent to the placement of the call, become physically connected directly to a loudspeaker which is configured to produce audio greater than or equal to 80 dB; and
    switch, responsive to such determination, the communications device from the secure mode to the unsecure mode.

* * * * *